UNITED STATES PATENT OFFICE.

I. M. LEGARÉ, OF AIKEN, SOUTH CAROLINA.

IMPROVEMENT IN IVORY-FRAME COMPOSITION.

Specification forming part of Letters Patent No. 20,569, dated June 15, 1858.

*To all whom it may concern:*

Be it known that I, I. M. LEGARÉ, of Aiken, in Barnwell district and State of South Carolina, have invented a new and useful Composition for Frame and other Ornamental Work; and I do hereby declare that the following is a full and exact description thereof.

To enable others skilled in the arts to make and use my composition, I will proceed to describe its preparation and properties.

Prepare a caustic-alkali solution by dissolving one part of subcarbonate of soda in eight parts of water, and adding one part of quicklime slaked in four parts of water. Dissolve in eight parts of this alkali, hot, eight parts of transparent resin, and stir well until saponified or creamy in appearance. Then stir in eight parts of kaolin or other neutral clay, adding two parts of resin, melted and mixed with one-half part of linseed-oil, boil, remove from the fire, and stir in four parts melted glue. Finally, work in, by kneading, six or eight parts of kaolin, which will give the proper doughy consistency. The glue is not essential, except to improve the quality of the composition. Without it the mass may be kept an indefinite period in jars or kegs. Any saponaceous compound may be substituted for the saponified resin if it have body enough. If the composition be used as prepared without the glue a small pinch of one of the salts of lime should be added to each moderate batch to quicken its "set." This constitutes a "putty" or composition much superior to that employed in the ornamental arts chiefly in the following particulars: in taking the sharpest impressions; in presenting a fine glossy surface to the touch; in coming clean from the mold, and so leaving the more delicate lines of the same unfilled by use; in possessing all valuable qualities of the composition hithereto used, such as allowing of water and oil gilding and burnishing, &c., and yet being prepared at less than half the cost of the former—viz., four cents per pound or under; and, finally, in its easy detection where fraudulently used, a small quantity of whiting (or of nearly any chemical salt) rendering ivory composition short and crumbly in a few moments, while an indefinite quantity of the first-named may be worked into the putty or composition now used without ill effects, since whiting is one of its chief constituents.

Ivory composition should be heated for working in a jar or other vessel plunged in a hot bath, not by the contact of steam. The refuse composition can be incorporated in the mass and worked over.

Ivory composition is applicable to all manner of interior decoration in relief—such as frame-making, manufacturing of ornamental furniture, decoration of ships and steamers, and of the interior of buildings.

What I claim as my invention, and desire to secure by Letters Patent, is—

The employment of any saponified material, in combination with a neutral clay, as a basis of my composition, substantially as set forth in the above specification.

I. M. LEGARÉ.

Witnesses:
 I. D. LEGARÉ,
 A. C. A. LEGARÉ.